W. R. CLARKSON.
CONVEYER FLIGHT.
APPLICATION FILED APR. 28, 1908.
919,419.
Patented Apr. 27, 1909.
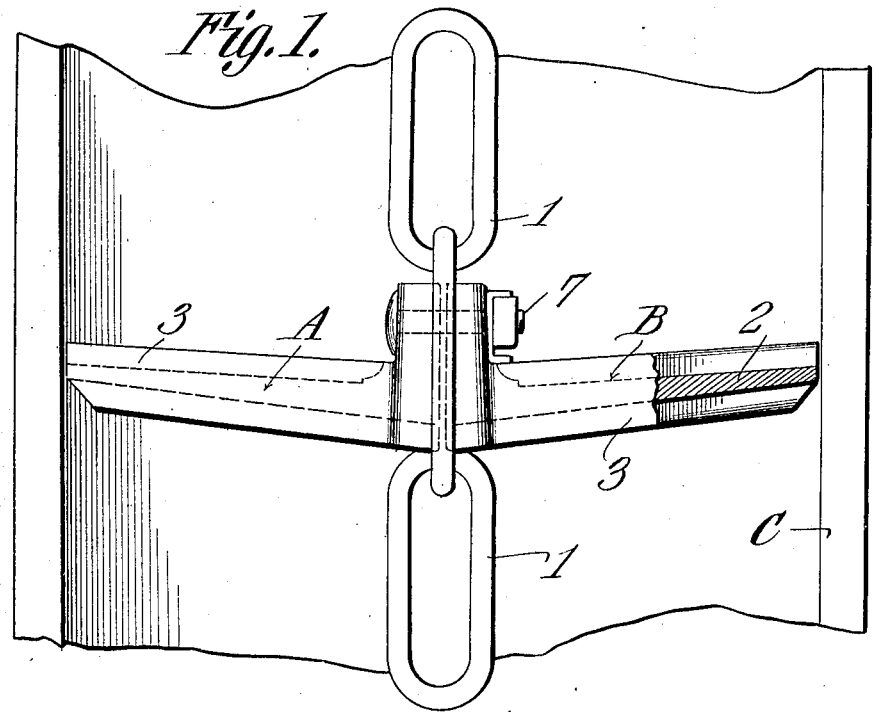
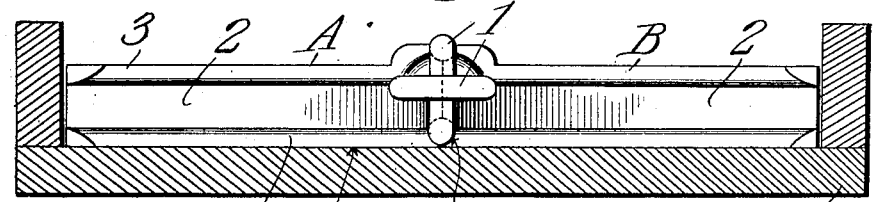
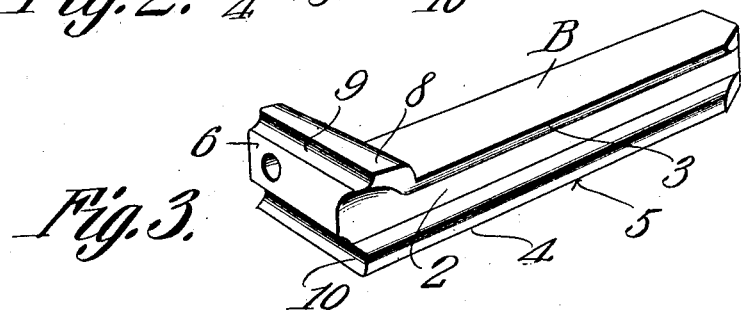
Witnesses
Inventor
William R. Clarkson.
By C. A. Snow & Co.
Attorneys

UNITED STATES PATENT OFFICE.

WILLIAM R. CLARKSON, OF TENINO, WASHINGTON, ASSIGNOR TO CLARKSON WASHER & NUT LOCK CO., INC., OF TENINO, WASHINGTON.

CONVEYER-FLIGHT.

No. 919,419.    Specification of Letters Patent.    Patented April 27, 1909.

Application filed April 28, 1908. Serial No. 429,690.

*To all whom it may concern:*

Be it known that I, WILLIAM R. CLARKSON, a citizen of the United States, residing at Tenino, in the county of Thurston and State of Washington, have invented a new and useful Conveyer-Flight, of which the following is a specification.

This invention relates to chain conveyers, and more particularly to flights for use in connection therewith.

The object of the present invention is to provide a sectional flight designed, when the parts are assembled, to clamp upon and engage opposite faces of a link of a chain and thus become fixed relative to the link.

A further object is to provide a sectional flight the parts of which are so assembled that either of them can be replaced by a new one in the event of wear or breakage.

A still further object is to provide a flight having grooved or recessed working faces designed to engage the material being conveyed and thus reduce to the minimum any tendency of the flights riding over the material.

With these and other objects in view the invention consists of certain novel features of construction and combinations of parts which will be hereinafter more fully described and pointed out in the claims.

In the accompanying drawings is shown the preferred form of the invention.

In said drawings:—Figure 1 is a plan view of a portion of a chain conveyer and one flight thereon constructed in accordance with the present invention. Fig. 2 is a transverse section through the conveyer and showing the flight in elevation. Fig. 3 is a detail view of one section of the flight.

Referring to the figures by characters of reference, 1 designates a conveyer chain preferably of that type made up of oval links, and the flight for use in connection therewith consists of two oppositely-disposed similar sections A and B, each of which consists of an elongated body portion made up of a web 2 and oppositely-extending top and bottom flanges 3 and 4 respectively, extending longitudinally of the web and forming channels therebetween. These flanges are preferably beveled toward the upper and lower faces of the body respectively, so as to produce comparatively sharp edges 5 located in the same plane as said top and bottom faces. Tongues 6 extend forward from the inner or adjoining ends of the two sections A and B, and the meeting faces of these tongues are so formed that when brought together the two sections will extend slightly forward along diverging lines. These tongues are held together in any preferred manner, preferably by means of a bolt 7 extending transversely through them. The two tongues extend above the upper faces of the sections A and B, there being upwardly-extending portions 8 upon the adjoining end portions of the sections and alining with the tongues. The meeting faces of the tongues and extensions are grooved longitudinally and when brought to register they form a longitudinal channel 9 in the top face of the flight. Said meeting faces of the tongues and sections A and B are also formed with longitudinally-extending substantially semi-cylindrical grooves 10 designed to register and form an opening, as shown. The transverse area of this opening is equal to the transverse area of one side of a link 1, and the grooves 10 and channel 9 are spaced apart a distance equal to the smallest internal diameter of one of the links. It will also be noted that the lowermost portions of the walls of grooves 10 are substantially flush with the bottom face of the flight.

In assembling the parts herein described, the sections A and B are placed at opposite sides of a link 1 and the upper and lower portions of this link will thus rest firmly within the channel 9 and the registering grooves 10. By inserting the bolt 7 through the tongues and securing it therein, the two sections will be tightly clamped upon the link. When the parts are thus positioned the lowest portion of the link will occupy substantially the same plane as the lowest space of the flight.

It is of course to be understood that any desired number of flights may be attached to the conveyer chain, and they can be spaced any desired intervals apart. When the conveyer is being drawn longitudinally of a race or trough C, the bottom faces of the flights will lie flat upon the bottom of the race and the material being conveyed will be properly engaged by the advancing edges of the flanges 3 and 4. As the bodies of the two sections A and B diverge forwardly toward their outer ends, it will be apparent that the conveyed material will be deflected more or less by them toward the chain and loss of material past the ends of the sections is thus reduced to the minimum. Obviously, should one of the sections of a flight become broken or otherwise rendered unfit for use, a new one may be substituted therefor without necessitating the substitution of an entirely new flight. By attaching the sections to a link in the manner described a firm connection is insured and there is no danger of the flight working loose and becoming ineffective.

Although this device has been shown and described for use in connection with a chain, it is to be understood that the same can be used equally as well with a cable or other flexible element.

What is claimed is:—

1. A flight for conveyers comprising oppositely-extending sections, means for detachably securing said sections together and upon an object inserted therebetween, and longitudinal flanges upon each section and disposed one above the other.

2. A flight for conveyers comprising detachably connected forwardly-diverging sections, and longitudinal flanges upon each section and disposed one above the other.

3. A flight for conveyers comprising oppositely extending separate sections, means for binding said sections upon opposite faces of an inserted element, and parallel longitudinal flanges upon each section and flush with the bearing faces thereof, one of said flanges being disposed above the other.

In testimony that I claim the foregoing as my own, I have hereto affixed my signature in the presence of two witnesses.

WILLIAM R. CLARKSON.

Witnesses:
JAS. M. WALKER,
WM. J. NEALE.